3,274,281
PROCESS FOR REMOVING NITRIC OXIDE FROM GAS MIXTURES CONTAINING HYDROGEN AND HYDROCARBONS

Josef Hirschbeck and Josef Riedl, Burgkirchen, Bavaria, Germany, assignors to Farbwerke Hoechst Aktiengesellschaft vormals Meister Lucius & Brüning, Frankfurt am Main, Germany, a corporation of Germany
No Drawing. Filed Dec. 3, 1963, Ser. No. 327,820
Claims priority, application Germany, Dec. 7, 1962, F 38,489
4 Claims. (Cl. 260—677)

The present invention relates to a process for removing nitric oxide from gaseous, olefin-containing hydrocarbon mixtures by catalytic hydrogenation.

Industrial, hydrocarbon-containing gas mixtures, for example gases from cracking, coke oven gases and the like, may contain nitric oxide and traces of oxygen which form nitrogen dioxide at low temperatures, above all in fractionating plants for gases. The nitrogen dioxide and unsaturated hydrocarbons of the gas mixture form compounds which readily polymerize and may decompose with explosion. Owing to the modifications in the gas mixtures disturbing and very explosive deposits and obstructions form in the apparatuses. It is, therefore, necessary to remove the nitric oxide (NO) from the gas mixture before it can form nitrogen dioxide and endanger the total unit.

It has already been proposed to remove nitric oxide from the crude gas mixture by converting it into nitrogen dioxide by the addition of oxydants before the gas mixture enters the colder zones of the unit, and removing the nitrogen dioxide by a series-connected alkaline gas wash. When operating in this manner it cannot be avoided that an excess of the difficulty removable oxydant comes into the hydrocarbon mixture, unless a partial removal of the nitric oxide is deemed sufficient.

Alternatively, nitric oxide can be removed from gas mixtures by converting it into nitrogen and ammonia by catalytic hydrogenation. When using for this purpose one of the known hydrogenation catalysts the olefinic hydrocarbons contained in the gas mixture are likewise hydrogenated. The noble metal-containing catalysts used on an industrial scale for the selective hydrogenation of acetylene hydrocarbons into olefins are not suitable either for the reductive removal of nitric oxide from olefin-containing gas mixtures in industrial plants. These catalysts are little effective for the conversion of nitric oxide into $N_2$ or $NH_3$, and therefore they require long periods of contact so that the olefins present in the gas mixture are partially hydrogenated.

It has now been found that nitric oxide, and acetylene hydrocarbons, if any, can be removed from gaseous olefin-containing hydrocarbon mixtures by catalytic hydrogenation by passing the gas mixtures at a temperature in the range of from about 180° C. to about 250° C. in the presence of hydrogen over a catalyst containing chromic oxide and nickel, the nickel content of the catalyst being 5–15%, calculated on the chromic oxide. The catalyst shall preferably contain 7–8% of nickel, calculated on $Cr_2O_3$. It may be used as such, however, for improving the resistance to abrasion it is advantageous to apply the catalyst to an inert carrier material, for example pumice, silica gel or aluminum oxide, by impregnation, rolling or any other known method.

The catalyst substance is prepared from oxides of chromium and nickel or from equivalent starting materials. By equivalent starting materials there are to be understood, for example, chromic anhydride $CrO_3$ and nickel nitrate, which are converted into $Cr_2O_3$ and $NiO$ by calcination. The nickel oxide is reduced to metallic nickel in a hydrogen current. The catalyst substance thus prepared is not pyrophoric. It can be stored and handled without special precaution.

After its introduction into the reaction zone and prior to starting the process with the gas mixture to be treated the catalyst is advantageously treated again with hydrogen for about 24 hours. The removal of nitric oxide and acetylene hydrocarbons, if any, from gas mixtures according to the process of the invention only requires short residence times so that with a reduction of expenditure pertaining to apparatus higher throughputs become possible.

If the gas mixtures to be treated are free from acetylene hydrocarbons, or the acetylene hydrocarbons need not be eliminated, the process can be carried out with a throughput of up to 8000 liters of gas mixture per hour and per liter of catalyst. When operating in this manner the nitric oxide is removed from the gas mixture to such an extent that it cannot be detected any longer in the mixture leaving the reaction zone.

When acetylene hydrocarbons are to be removed simultaneously a throughput of up to approximately 5000 liters of gas mixture per liter of catalyst and per hour is possible.

The olefins contained in the treated gas mixture remain substantially unchanged.

The following examples serve to illustrate the invention but they are not intended to limit it thereto.

Example 1

Catalyst: $Cr_2O_3/Ni$ on pumice, 10% of $NiO$, calculated on $Cr_2O_3$ prior to reduction, corresponding to 7.5% of $Ni$.

Throughput: 300 liters of gas mixture per hour and liter of catalyst.

Temperature: 200° C.

Composition of gas mixture:

|  | Percent by volume | |
|---|---|---|
|  | Prior to treatment | After treatment |
| $H_2$ | 23.6 | 19.5 |
| $CH_4$ | 18.8 | 19.8 |
| $N_2$ | 1.0 | 1.1 |
| $CO$ | 2.9 | 3.1 |
| $C_2H_6$ | 1.5 | 2.8 |
| $C_2H_4$ | 27.5 | 31.8 |
| $C_2H_2$ | 4.0 | (2) |
| Higher hydrocarbons | 20.7 | 21.9 |
| $NO$ | [1] 500 | (2) |

[1] Parts per million.
[2] Undetectable.

NO as well as acetylene were removed to such an extent that they could no longer be detected. The increase in the ethylene content and the minor increase in the ethane content prove the high selectivity of the catalyst.

Example 2

Catalyst: $Cr_2O_3/Ni$ on pumice, 10% of NiO prior to reduction, corresponding to 7.5% of Ni, calculated on $Cr_2O_3$.
Throughput: 500 liters of gas mixture per liter of catalyst and hour.
Temperature: 200° C.

Composition of gas mixture:

|  | Percent by volume | |
| --- | --- | --- |
|  | Prior to treatment | After treatment |
| $H_2$ | 19.10 | 18.80 |
| $N_2$ | 0.90 | 0.90 |
| CO | 1.80 | 2.00 |
| $CH_4$ | 21.10 | 21.00 |
| $C_2H_6$ | 1.80 | 1.90 |
| $C_2H_4$ | 35.50 | 35.50 |
| Allene | 0.20 | 0.11 |
| $C_3$ and higher hydrocarbons | 19.60 | 19.79 |
| NO | [1] 97 | (2) |
| $C_2H_2$ | [1] 156 | [1] 0.4 |

[1] Parts per million.
[2] Undetectable.

Example 3

Catalyst: $Cr_2O_3/Ni$ on pumice, 10% of NiO prior ot reduction, corresponding to 7.5% of Ni, calculated on $Cr_2O_3$.
Throughput: 1000 liters of gas mixture per hour and liter of catalyst.
Temperature: 200° C.

Composition of gas mixture:

|  | Percent by volume | |
| --- | --- | --- |
|  | Prior to treatment | After treatment |
| $H_2$ | 17.90 | 17.60 |
| $N_2$ | 0.90 | 0.90 |
| CO | 1.70 | 1.80 |
| $CH_4$ | 25.30 | 25.20 |
| $C_2H_6$ | 1.90 | 2.10 |
| $C_2H_4$ | 36.48 | 36.45 |
| Allene | 0.17 | 0.09 |
| $C_3$ and higher hydrocarbons | 15.65 | 15.65 |
| NO | [1] 110 | (2) |

[1] Parts per million.
[2] Undetectable.

Example 4

Catalyst: $Cr_2O_3/Ni$ on pumice, 10% of NiO prior to reduction, corresponding to 7.5% of Ni, calculated on $Cr_2O_3$.
Throughput: 8000 liters of gas mixture per liter of catalyst and hour.
Temperature: 200° C.

Composition of gas mixture:

|  | Percent by volume | |
| --- | --- | --- |
|  | Prior to treatment | After treatment |
| $H_2$ | 17.80 | 17.70 |
| $N_2$ | 0.83 | 0.83 |
| CO | 2.08 | 1.96 |
| $CH_4$ | 22.20 | 22.00 |
| $C_2H_4$ | 36.80 | 36.40 |
| $C_2H_6$ | 2.08 | 2.14 |
| Allene | 0.24 | 0.19 |
| $C_3$ and higher hydrocarbons | 17.97 | 18.78 |
| NO | [1] 215 | (2) |

[1] Parts per million.
[2] Undetectable.

Example 5

Catalyst $Cr_2O_3/Ni$ without carrier: 7.7% of Ni calculated on $Cr_2O_3$.
Temperature: 250° C.
Throughput: 4000 liters of gas per hour and liter of catalyst.

Composition of gas mixture:

|  | Percent by volume | |
| --- | --- | --- |
|  | Prior to treatment | After treatment |
| $H_2$ | 16.2 | 15.6 |
| $CH_4$ | 23.8 | 23.8 |
| $N_2$ | 0.9 | 0.9 |
| CO | 2.1 | 2.1 |
| $C_2H_6$ | 2.7 | 2.7 |
| $C_2H_4$ | 37.7 | 37.8 |
| $C_2H_2$ | [1] 3,300 | [1] >5 |
| Higher hydrocarbons | 16.3 | 17.1 |
| NO | [1] 280 | (2) |

[1] Parts per million.
[2] Undetectable.

Example 6

Catalyst $Cr_2O_3/Ni$ without carrier: 7.7% Ni, calculated on $Cr_2O_3$.
Temperature: 180° C.
Throughput: 3300 liters of gas per hour and liter of catalyst Composition of gas mixture:

|  | Percent by volume | |
| --- | --- | --- |
|  | Prior to treatment | After treatment |
| $H_2$ | 16.5 | 17.8 |
| $CH_4$ | 24.4 | 23.9 |
| $N_2$ | 0.6 | 0.6 |
| CO | 2.5 | 2.6 |
| $C_2H_6$ | 2.7 | 2.7 |
| $C_2H_4$ | 38.0 | 38.1 |
| Higher hydrocarbons | 15.3 | 16.3 |
| NO | [1] 500 | (2) |

[1] Parts per million.
[2] Undetectable.

Example 7

Catalyst: $Cr_2O_3/Ni$ without carrier: 7.7% Ni, calculated on $Cr_2O_3$.
Temperature: 250° C.
Throughput: 3300 liters of gas per hour and liter of catalyst.

Composition of gas mixture:

|  | Percent by volume | |
| --- | --- | --- |
|  | Prior to treatment | After treatment |
| $N_2$ | 16.5 | 15.5 |
| $CH_4$ | 24.4 | 24.1 |
| $N_2$ | 0.6 | 0.6 |
| CO | 2.5 | 2.5 |
| $C_2H_6$ | 2.7 | 2.7 |
| $C_2H_4$ | 38.0 | 37.9 |
| Higher hydrocarbons | 15.3 | 16.7 |
| NO | [1] 500 | (2) |

[1] Parts per million.
[2] Undetectable.

Example 8

Catalyst: $Cr_2O_3/Ni$ without carrier, 12% Ni, calculated on $Cr_2O_3$.
Temperature: 200° C.
Throughput: 1250 liters of gas per hour and liter of catalyst.

Composition of gas mixtures:

|  | Percent by volume | |
|---|---|---|
|  | Prior to treatment | After treatment |
| $H_2$ | 15.6 | 15.7 |
| $CH_4$ | 25.3 | 25.2 |
| $N_2$ | 0.6 | 0.6 |
| $CO$ | 2.6 | 2.7 |
| $C_2H_6$ | 2.4 | 2.6 |
| $C_2H_4$ | 37.9 | 38.0 |
| Higher hydrocarbons | 15.6 | 15.2 |
| $NO$ | [1] 180 | [2] |

[1] Parts per million.
[2] Undetectable.

*Example 9*

Catalyst: $Cr_2O_3$/Ni without carrier, 3.4% Ni, calculated on $Cr_2O_3$.
Temperature: 200° C.
Throughput 4000 liters of gas per hour and liter of catalyst.
Composition of gas mixture:

|  | Percent by volume | |
|---|---|---|
|  | Prior to treatment | After treatment |
| $H_2$ | 15.7 | 15.6 |
| $CH_4$ | 23.8 | 24.0 |
| $N_2$ | 0.6 | 0.6 |
| $CO$ | 2.5 | 2.6 |
| $C_2H_6$ | 2.8 | 2.9 |
| $C_2H_4$ | 38.0 | 37.8 |
| Higher hydrocarbons | 16.6 | 16.5 |
| $NO$ | [1] 400 | [2] |

[1] Parts per million.
[2] Undetectable.

We claim:
1. Process for removing nitric oxide from gaseous, olefin-containing hydrocarbon mixtures by catalytic hydrogeneration with simultaneous conversion of the acetylene hydrocarbons present into olefins, which comprises passing the gaseous mixtures at a temperature in the range of 180° C. to 250° C. over a catalyst containing chromium oxide and nickel, the nickel content being 5–15%, calculated on the content of $Cr_2O_3$.
2. The process of claim 1, wherein the nickel content of the catalyst is 7 to 8%, calculated on the content of $Cr_2O_3$.
3. The process of claim 1, wherein the catalyst used is supported on a carrier material.
4. The process of claim 3 wherein the catalyst used is supported on a carrier material selected from the group consisting of pumice, silica gel and aluminium oxide.

References Cited by the Examiner

UNITED STATES PATENTS

| 1,836,927 | 12/1931 | Kinckh et al. | 260—677 |
| 2,735,879 | 2/1956 | Redcay | 260—677 |
| 2,840,531 | 6/1958 | Fleming et al. | 260—677 |
| 3,084,023 | 2/1963 | Andersen et al. | 260—677 |

FOREIGN PATENTS

| 704,427 | 2/1931 | France. |

ALPHONSO D. SULLIVAN, *Primary Examiner.*